United States Patent
Yancey et al.

(10) Patent No.: US 10,445,813 B2
(45) Date of Patent: Oct. 15, 2019

(54) TAP WALLS THAT RECOMMEND PRODUCTS BASED ON IN-STORE AND OUT-OF-STORE INTERACTIONS OF ANONYMOUS USERS

(71) Applicant: Cloudtags, Inc., Atlanta, GA (US)

(72) Inventors: James Yancey, Atlanta, GA (US); Eric Carlyle, Atlanta, GA (US)

(73) Assignee: Cloudtags, Inc., Atlanta, GA (US)

( * ) Notice: Subject to any disclaimer, the term of this patent is extended or adjusted under 35 U.S.C. 154(b) by 472 days.

(21) Appl. No.: 15/390,245

(22) Filed: Dec. 23, 2016

(65) Prior Publication Data

US 2018/0075515 A1  Mar. 15, 2018

Related U.S. Application Data

(63) Continuation of application No. 15/262,002, filed on Sep. 11, 2016.

(51) Int. Cl.
*G06F 7/00* (2006.01)
*G06F 17/30* (2006.01)
*G06Q 30/06* (2012.01)
*G06Q 10/06* (2012.01)

(52) U.S. Cl.
CPC ... *G06Q 30/0631* (2013.01); *G06Q 10/06398* (2013.01)

(58) Field of Classification Search
CPC ......... G06Q 30/0631; G06Q 10/06398; G06Q 30/0633
See application file for complete search history.

(56) References Cited

U.S. PATENT DOCUMENTS

| | | | |
|---|---|---|---|
| 2013/0110666 A1* | 5/2013 | Aubrey | G06Q 30/0269 705/26.5 |
| 2015/0199667 A1* | 7/2015 | Fernando | G06Q 20/202 705/21 |
| 2016/0005020 A1* | 1/2016 | Fernando | G06F 3/048 705/21 |

* cited by examiner

*Primary Examiner* — Azam M Cheema
(74) *Attorney, Agent, or Firm* — Clayton, McKay & Bailey, PC

(57) ABSTRACT

A system can include a tap wall that has multiple screens for display product images to customers. The tap wall can be populated by a server. The tap wall can prompt a user to visit an address on their user device. The address can direct the user device to the server, allowing the server to open a socket communication with both the user device and the tap wall. The server can access a first party cookie on the user device and display products on the tap wall based on products associated with the first party cookie. A user can build a collection of products both in-store and out-of-store that get associates with the cookie. The user can remain anonymous while the system does makes relevant product recommendations on the tap wall based on the user's entire browsing experience.

17 Claims, 11 Drawing Sheets

| Store ID | Invoice ID | Sale Date | Item SKU | Quantity | Customer ID |
|---|---|---|---|---|---|
| 1 | 1 | 1/1/16 | SKU1 | 1 | ABC |
| 1 | 1 | 1/1/16 | SKU2 | 2 | ABC |
| 2 | 2 | 1/2/16 | SKU3 | 1 | ABD |
| 2 | 2 | 1/2/16 | SKU1 | 1 | ABD |
| 1 | 3 | 1/2/16 | SKU4 | 4 | ABE |

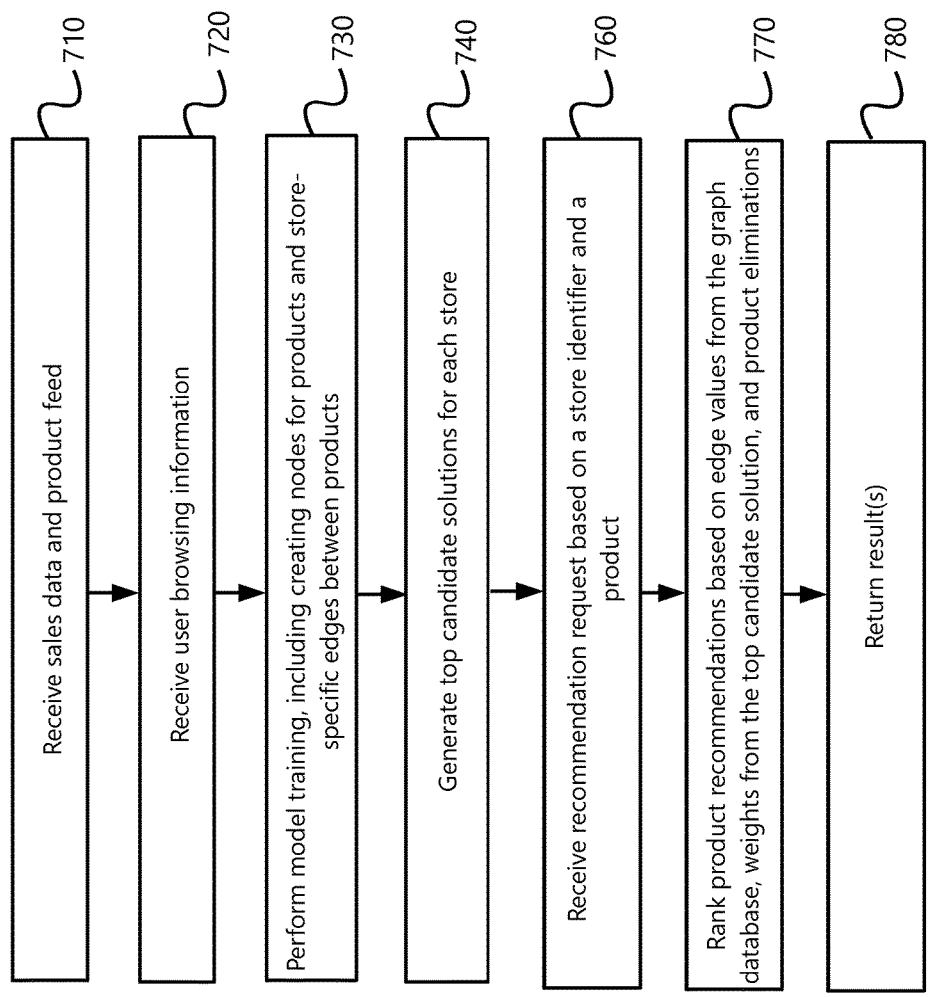

TAP WALLS THAT RECOMMEND PRODUCTS BASED ON IN-STORE AND OUT-OF-STORE INTERACTIONS OF ANONYMOUS USERS

CROSS REFERENCE TO RELATED APPLICATION

This application is a continuation-in-part application of application Ser. No. 15/262,002, filed Sep. 11, 2016, which is hereby incorporated by reference in its entirety.

BACKGROUND

Integrating online and in-store interactions can allow for better customer service. When a user is browsing for a product online, that history can be useful in recommending similar products. However, current systems for integrating an online browsing experience to in-store shopping are lacking in at least three ways. First, they require the user to give up their anonymity. Second, they do not provide real-time recommendations. Thirdly, they do not account for an in-store experience or have a physical presence in the store. These shortcomings are discussed more specifically below.

First, many technologies for assisting a user in-store require the user to identify themselves. This can include logging into an application, which is something users might be reluctant to do, particularly in-store. It can also include providing a phone number or email address to join a rewards program. Users generally do not want to give up their anonymity without clear benefits of doing so, particularly at a store that they do not frequent. While users desire an efficient shopping experience, they also do not want become inundated with spam or other advertisements based on an isolated shopping trip. As a result, a large portion of a store's customer base will not use this technology, deriving no benefit for the user or the store.

Second, in-store recommendation technologies generally do not assist the customer in real-time. For example, stores implement loyalty and rewards programs in an effort to track what a customer has purchased. But that technology does not provide real-time product recommendations when the customer is in the store. Instead, it functions primarily coupon campaigns and other programs unrelated to in-store engagement.

Current real-time recommendation technologies do not account for an in-store experience. As the user shops on a web page, the web page can display recommended products. But current systems are not capable of recommendations that are unique to the particular store. Unlike a website that is accessed from all over the country or the world, each physical store has specific considerations related to its local customer base. These include product placement and availability, which can be based on geographically-relevant attributes. Current recommendation technology does not address this reality. Instead, product recommendation technology so far has largely remained limited to Internet shopping recommendations.

Existing technologies also do not have a physical presence at the store that can increase the efficiency of the store itself. At best, a user is left to wander the isles of the store while manually looking up information on their phones. The store must maintain a large footprint and display area because none of the display functionality is integrated into the recommendation system.

In sum, current technologies do not effectively link the in-store user experience to the online shopping experience in a way that most benefits the store and its customers.

As a result, a need exists for tap walls that integrate in-store and out-of-store interactions of anonymous users.

SUMMARY

An example system includes a tap wall that includes one or more computing devices for presenting products to users. For example, the tap wall can be a two-dimensional array of tablets mounted on a wall at the store.

The system can include a tap wall including a plurality of screens. The screens can each be populated with different products that a user, such as a store customer, might be interested in. The plurality of screens can be individual computing devices, such as tablets, arranged in any configuration. Alternatively, one or more computing devices, such as televisions, can use split screen technology, frames, or other graphical division technology to create the plurality of screens. The screens can be touch sensitive, and populated to include images of products available from a store. A first user can approach the tap wall and touch a product image displayed in one of the screens to receive more information about the product. Based on which products the user selects, different related products can be added to the tap wall.

The system can also include a server that populates the screens of the tap wall. As will be explained, the population of the screens can be based on product recommendations for a particular user and store. The server can include one or more servers, such as a recommendation server and a retailer server.

The server can perform performs stages including receiving a message from the tap wall in response to the user touching one of the screens. The message can include an identifier that the server uses to determine a first product was touched. For example, each screen can have an identifier appended to a uniform resource locator ("URL"). Alternatively, the URLs can be unique for each screen. Using the URL, the server can identify the screen, the tap wall, and the store, in one example. The server can track which products are associated with which screens, allowing the server to determine which product the user has touched. The server can also track which screens are associated with which stores. The product and store can be used to retrieve further recommendations.

The server can determine whether an active user exists for the tap wall. An active user can be any user whose user device, such as a smart phone, is connected in a socket for communication with the tap wall. An anonymous user at the tap wall can be prompted to use their own computing device to connect to a short URL. The short URL can direct the user device to the server. In one example, when no active user is detected at the tap wall, the server sends a message to the tap wall that causes a screen to display a prompt for the user to visit the URL. The user can simply type the URL into a browser on their phone in one example.

The URL can direct the user device to the server, allowing the server to open a socket communication with the user device. This can allow the server to present content in the browser executing on the user device. By controlling the content in the browser and on the screens of the tap wall, the server can facilitate interaction between the two. The touched product on the tap wall can cause product information to load on the user device. The server provides this information to the user device via the socket. The server can continue to do this for each product the user touches on the tap wall.

In addition, the connection allows the server to gain access to a first party cookie stored on the user device. The first party cookie can be used to track which products the user has viewed or touched in-store. It can also allow the server to track which products the user has browsed online. When the user goes to a website associated with the server, the server can continue to use both in-store and out-of-store product tracking to assist the user. This can include requesting a list of products from a retailer server in one example, and storing both in-store and out-of-store interactions together. For example, bestbuy.com could be affiliated with BEST BUY. The first party cookie can be maintained by the retailer in a cookie store. The cookie store can be kept on a retailer server in one example. Alternatively, the recommendation server can maintain the cookie store.

The in-store and out-of-store interactions can be used to provide relevant recommendations on the tap wall. As the user selects particular products, related products can be displayed on the tap wall. In one example, the server can include a recommendation engine. The recommendation engine can receive product and store identifiers as inputs. The product identifiers can be culled from a cookie store that includes both the user's in-store and out-of-store browsing. Alternatively or in addition, the user can build a collection based on in-store and out-of-store browsing, and the products in the collection can be used as inputs to the recommendation engine. The store identifier can be a tap wall identifier or device identifier within the tap wall, in an example. The recommendation engine can execute a genetic algorithm on a graph database to determine which recommended products to add to the tap wall.

In one example, the retailer server hosts a retailer website that provides more product information based on product selection by the user. The tap wall can include links to the retailer server in one example. The retailer server can also maintain a cookie that tracks user experience on the retailer website and the tap wall. When the user selects a link, the cookie can be updated. The retailer server can communicate the selection to the recommendation server, allowing the recommendation server to update the tap wall.

Alternatively, for an in-house solution, the recommendation server can maintain the cookie, product tracking, and product information. The recommendation server can receive the product information from the retailer server. This product information can be used by the recommendation engine. The recommendation server can also host a website that allows the user to explore more information regarding the retailer's products. This can allow both the product tracking and recommendations to be performed by a single entity, at one or more servers that make up the recommendation server. The product tracking information (e.g., from the cookie) can be sent from the recommendation server back to the retailer server, allowing the retailer to update their own product tracking records. This can occur each time the cookie is updated or periodically. In this way, cookie stores between the recommendation server and the retailer server can be synchronized.

In another example, a store device used by a sales associate can be used to add products to the tap wall. The store device can also be used to add or remove products from a user's collection in one example. Building a collection can help the user continue shopping even after they leave the physical store. It can also allow the recommendation engine to recommend products based on those in the user's collection. The system can accomplish these collections and recommendations without even collecting the user's name or email address. This leads to drastically higher implementation of the system, with much more benefit to the store and the customer.

The sales associate that recommended a product can also be tracked. For example, if a staff member adds an item to a tap wall or user collection, an identifier of the staff member can be stored along with the product recommendation. This can include storing an identifier for the staff member in the user's cookie in association with the product identifier. If the user later visits the retailer website, the cookie will retain the information indicating that the staff member recommended a particular product. If the user ultimately buys that product, the retailer website can attribute a sales commission to the tracked staff member.

In one example, the server can use ultrasonic frequencies to determine which user is at a particular tap wall. The server can register a unique ultrasonic frequency with a user device that connects to the URL. This can allow the server to detect which user device is active at the tap wall. It can also be used to distinguish between users at different portions of a single tap wall. In one example, when the user device connects to the server, the server sends the browser and instruction to play audio at a first ultrasonic frequency. The server associates the first ultrasonic frequency with the first user device (e.g., with a cookie identifier). The server can assign and associate a second ultrasonic frequency with a second user device. Other user devices can be assigned different frequencies, and likewise be identified at the server.

The screens of the tap wall can be equipped with at least one microphone. For example, each tablet in an array can include its own microphone. The microphones can detect the ultrasonic frequency coming from a nearby device. The server or tap wall can determine whether the frequency is the first or second ultrasonic frequency. Based on that determination, the server can identify which of the first and second user devices is active at a tap wall or a portion of a tap wall. This can be useful in ensuring that the correct product information is sent to the correct device and associated with the correct cookie store. For example, if the first user is at a first tap wall and a second user is at a second tap wall, the unique ultrasonic frequencies can allow the server to associate the correct user devices with the correct tap walls. This allows the server to correctly route touched products according to which user device is active at which tap wall.

Alternatively, a single tap wall could be divided into sections such that the server or tap wall can distinguish which ultrasonic frequency is dominant at which section of the tap wall. The server can make sure that recommended products corresponding to the first user get displayed in a first section of the tap wall where the user is active. Likewise, recommended products based on the second user can be displayed in the second section of the tap wall where the second user is active.

Other technologies can be used instead of ultrasonic frequencies. For example, beacons can be used to determine the relative location of a user device compared to one or more tap walls. Alternatively, an icon system can allow the first user to confirm their location with a series of icons or prompts sent from the server to the first user device based on the open socket connection.

It is to be understood that both the foregoing general description and the following detailed description are exemplary and explanatory only and are not restrictive of the examples, as claimed.

BRIEF DESCRIPTION OF THE DRAWINGS

FIG. 5C is an exemplary line item sales data feed;
FIG. 7 is an exemplary flow chart of steps performed in a system.

DESCRIPTION OF THE EXAMPLES

Figure 1:
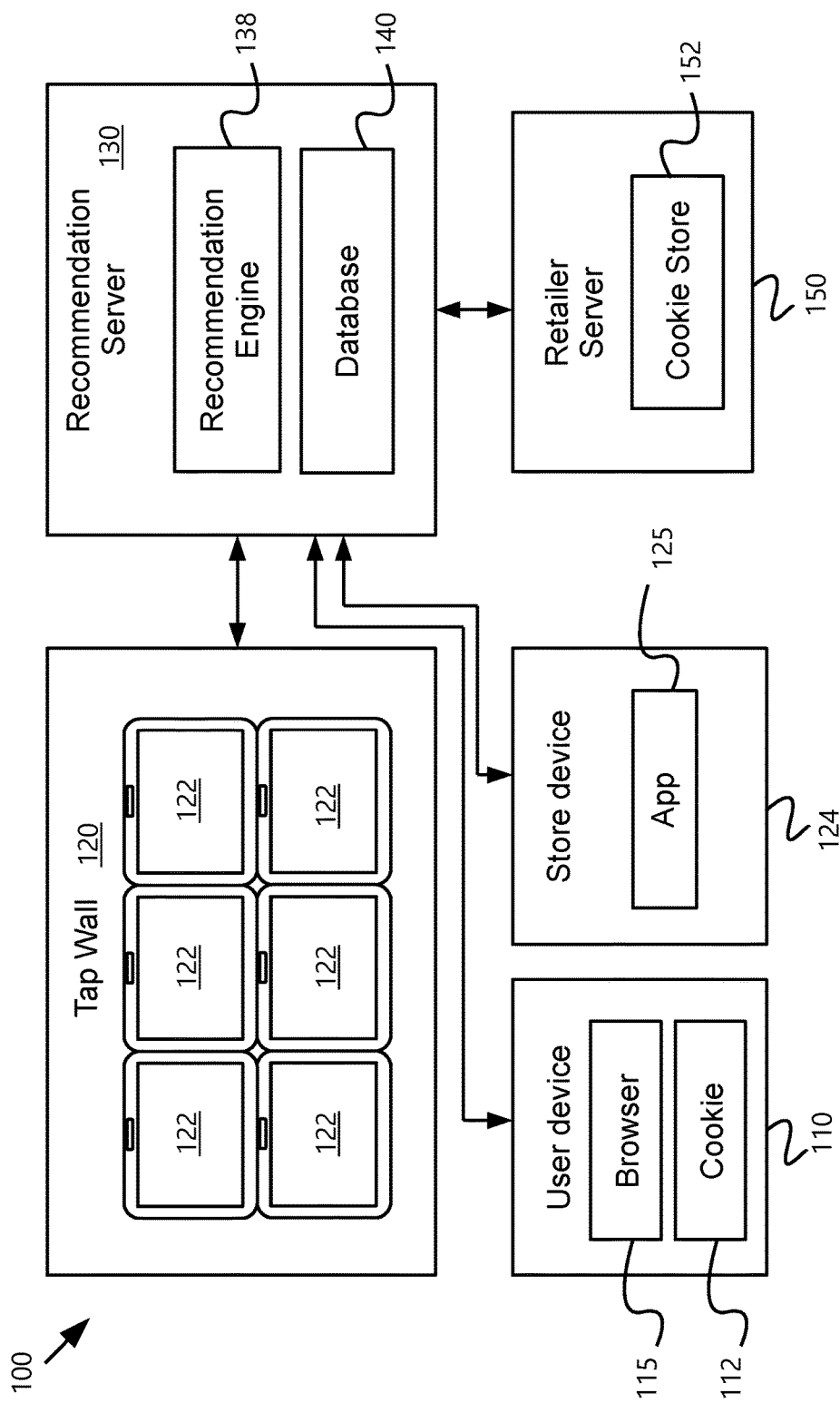
FIG. 1 is an exemplary illustration of system components.

Reference will now be made in detail to the present examples, including examples illustrated in the accompanying drawings. Wherever possible, the same reference numbers will be used throughout the drawings to refer to the same or like parts.

Examples described here include systems that allow a user to maintain anonymity while receiving in-store product recommendations. The system can include a tap wall that is made up of one or more computing devices. The tap wall can include multiple screens. These screens can be screens of different computing devices, or a divided screen space on a single computing device. The tap wall can be mounted in a retail location, such as a store or street-side stand. The screens of the tap wall can display various available products. A server can populate the tap wall screens with products available from a store.

To use the tap wall, a user can touch one of the displayed products. This can activate an underlying link. The link can indicate the screen where the product is displayed or identify the product itself. The link causes the tap wall to communicate with the server. The server can determine which product and which store are implicated by the tap wall selection.

The server can also determine which user device to associate with the selection on the tap wall. If there is no active user device, the server can send a message to the tap wall for display. The message can direct a user to navigate to a URL on his or her device to receive more information. Upon doing so, the user device is directed to the server, and a socket communication is opened between the server and the user device. The server can provide product information on the user device. Each time the user selects a new product on the tap wall, the server can send relevant product information to the user device.

In addition, the server can gain access to a first party cookie on the user device that is associated with the URL. Using the cookie, the server can access product-browsing history. The server can user the history to inform product recommendations to display on the tap wall screens. Based on the user's selections, the server can associate additional products with the user's cookie. When the same user device is used online, the in-store history can still be accessed. The out-of-store history likewise can be accessed for the in-store experience. When the user utilizes either the tap wall or their browser, the shopping experience can be tracked. In one example, the server contacts a retailer server to allow the retailer to update its data or cookie store in relation to the user device.

The user can also build a collection of products. The collection can unite the user's selections in-store and online. The user can add and remove products from the collection. The collection itself can be stored at the server in association with a device identifier in the cookie. A sales agent can also use a store device to assist the user with their collection in one example. The sales agent can select an option to pair with a user. This can cause the store device to contact the server, which sends a message to the active user device for the tap wall, requesting pairing. If the user accepts, the sales agent can add and remove items from the user's collection. They can also enter a chat room facilitated by the server in one example. In one example, the system tracks which sales agent recommended which products. This can allow for accurate assignment of commissions, even when a user leaves the store and later purchases the recommended products online.

The server can provide recommended products for display on the tap wall based on the cookie or collection of the active user. In one example, the server utilizes a recommendation engine to generate recommended products for display on the tap wall. The products associated with the cookie or collection can serve as inputs to the recommendation engine. A further input can be a store identifier. This can allow the recommendation engine to ensure that the recommended products are available at the store associated with the tap wall. The recommendation engine can utilize a genetic algorithm with a graph database to determine top product recommendations based on products associated with the user's cookie or collection. The graph database can include correlations between products at various stores. The nodes matching the user's products can be traced to additional products through an iterative process that is described below.

To make all of this possible, the user does not need to download a particular app or supply identifying information, such as their name or email, in an example. Because the user maintains their anonymity, they are more likely to use the system. The retailer and user can both benefit from the experience without the user needing to do anything more than enter a short URL into the browser of their user device.

FIG. 1 illustrates an exemplary system 100 for tap walls 120 that integrate in-store and out-of-store interactions of anonymous users. A tap wall 120 can be placed in a physical location, such as in a store or at a roadside booth. The tap wall 120 can include numerous computing devices 122, such as tablets or televisions. The computing device 122 can be organized in various configurations to fit demand or a particular physical space. The screens of the computing devices 122 can be populated with various products available at a store. In one example, the tap wall can be presented on a single computing device. The screen space of the computing device 122 can be divided into multiple screens.

In another example, the computing device(s) 122 of the tap wall 120 can include touch screen technology. This can allow users to tap product images displayed on the tap wall 120. In another example, a touch screen layer can be added to the computing devices 122. In another example, near field communication ("NFC") technology can be used to detect a user selection. Either a physical touch or touch detected by NFC can be considered a touch for the purposes of this disclosure.

The tap wall 120 can be populated with products by a server 130, 150. The server 130 can be a recommendation server 130, retailer server 150, or both. As used herein, it is understand that referring to a server 130 can include one or both of these servers 130, 150. Additionally, the server 130 can include one or more servers.

The system 100 can utilize a recommendation server 130 to provide in-store product recommendations based on the store's inventory and products receiving interest from a customer. Rather than relying solely on a sales agent to point a customer to relevant alternative or additional products, optimal recommendations can be made by a recommendation engine 138. The recommendation engine 138 can execute at the recommendation server 130. In another example, the recommendation engine 138 can execute at one or more servers that are separate from the recommendation server 130.

The system 100 can provide more product information for the tapped product on the user device 110. User device 110 and store device 124 can be any computing device, such as a cell phone, laptop, tablet, personal computer, workstation, television, or television receiver. Each can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

To provide the product information, the system 110 can prompt the user to browse to a short URL. In one example, the tap wall 120 prompts the user to navigate to the URL. The prompt can be displayed in response to the user tapping a product on the tap wall 120. The URL can direct the user device to the server 130, 150. This can allow the server 130, 150 to open a socket with the user device 110.

This can have multiple benefits. First, the server 130, 150 can use the socket connection to provide product information to the browser 115 of the user device 110. This causes the user device 110 to display more information about the product, helping the user make a purchase decision.

In one example, the customer can operate a user device 110, such as the customer's personal phone to retrieve information about a product. The user can go to a uniform resource locator ("URL") associated with the store, for example, as prompted by the tap wall 120. The website at that location can determine the user is at the physical store. For example, the URL can be specific to the store. When the user goes to the URL, the website can automatically determine which store identifier to associate with the user. For example, a first URL can indicate a first store identifier and a second URL can indicate a second store identifier. In another example, the website can request access to the user's location. If the user grants access, the website can determine which store identifier to associate with the user.

Second, the server 130, 150 can integrate a browsing history from the user device 110. In one example, because the user device 110 is communicating with the retailer server 150, the retailer server 150 can access a cookie 112 on the user device 110, in an example. The cookie 112 can be a first party cookie. The cookie 112 can track products that the user has reviewed in-store on the tap wall 120 and online at the store website and on other websites associated with the retailer. In one example, the recommendation server 130 can receive product information from the cookie 112. The product information can be used to identify a target product for use as an input to the recommendation engine.

The cookie 112 can provide an identifier that allows the server 130, 150 to store a collection of products associated with the anonymous user. In one example, this includes updating a cookie store 152 based on selections made in-store and online when the user is away from the store. The collection can be editable by the user, the sales agent, or both.

The user's collection can also be updated to track which sales agent recommended which products. This tracking can be used during checkout to ensure the sales agent is paid a commission. The sales agent can add a product to the tap wall 120 using the store device 124. Alternatively, the sales agent can add the product straight to the user collection. In either case, the cookie 112 can update to identify the sales agent that recommended the product that the user has added to their collection. This can allow the system 100 to allocate commissions based on which sales agent recommended a purchased product.

This can even be the case when the user's purchase occurs out of store. For example, if a sales agent places a product on the tap wall 120, then the user adds that product to their collection, an identifier for the sales agent can be stored with the added product. The identifier can be stored in the cookie 112, on the user device 110. The user can leave the store. Later, when the user visits the retailer website, the retailer server 150 can read the cookie 112 and recommend the same items the user saw at the store. Based on the cookie 112, the user can pull up their saved collection, which can also be in the form of a shopping cart. When the user checks out, the retailer server 150 can check the cookie 112, cookie store 152, or other backend database to see if a sales agent is associated with any of the products that the user is purchasing. If so, the server 150 can allocate a commission to the sales agent. These steps can alternatively be performed by the recommendation server for a fully in-house solution.

The recommendation engine 138 can recommend products for display on the tap wall 120. The recommendation engine 138 can take existing products as inputs. These existing products can be products in a collection associated with the user device 110. The collection can include products saved by either the user or a sales agent. In one example, the sales agent can use a store device 124 to add or remove products from the user's collection. The product inputs can also be products associated with the first party cookie 112 on the user device 110.

In one example, a sales agent can assist a customer by reporting one or more products that the customer is interested in to the recommendation server 130. In one example, the sales agent can use a store device 124, such as a tablet, phone, or register, to identify products relevant to the customer.

In one example, the store device 124 can directly select products for inclusion on the tap wall 120. An application 125 can execute on the store device 124 for selecting products that the user is interested or for suggesting to the user. Based on those products and the store to which the sales agent or store device 124 is assigned, the recommendation engine 138 can recommend additional products for the customer to review. The application can report a store identifier associate with the store to the recommendation server 130 as part of the recommendation request. The store identifier can be stored locally in one example as part of an agent profile of the sales agent. The store device 124 can add one or more of the products to the tap wall 120 or the user's collection using the application 125.

In one example, the application 125 is a browser that executes on the store device 124. The sales agent can log into a website associated with the store. The website can be part of a retailer server 150. The retailer server 150 can send the recommendation requests to the recommendation server 130 based on inputs by the sales agent at the website. Additionally, the retailer server 150 can send a store identifier to the recommendation engine 138 as part of the recommendation request.

The recommendation engine 138 can be utilized to change one or more products displaying on one or more screens of the tap wall 120. Based on the target product(s) and the store identifier, the recommendation engine 138 can determine at least one candidate product to recommend to the user. The candidate product can be sent to either the store device 124 or the user device 110, depending on the example.

In one example, the recommendation server 130 is located remotely from the user device 110 and store device 124. This can allow the recommendation server 130 to collect information from multiple stores. Store information can be maintained in a database 140. Each store can have a unique store identifier. Related stores, such as different stores of the same retail company, can be grouped in an example. Stores can also be grouped by type in one example.

In one example, the recommendation engine 138 builds a graph database that is stored in database 140. The database 140 can be located at the recommendation server 130 or can execute on a different computing device. The database 140 can store information related to various stores, such as product inventory, invoices, products sold, and other information. The database 140 can also store user information to build a history of products that the user has viewed or inquired about in the past.

In one example, the information stored in the database 140 can be based on a sales information and product inventory information from the store. The recommendation server 130 can receive a product feed from a computing device associated with a retailer. In one example, a store device 124 associated with a first store send the product feed to the recommendation server 130. The product feed can indicate the quantity of the product that remains at the first store.

The recommendation server 130 can also receive line item data that includes a customer order from a point of sale system at the first store. The point of sale system can be the store device 124 in one example, and a different computing device in another example. The customer order can include an invoice identifier, a store identifier, a customer identifier, the product identifier, a date, and a purchased quantity.

Based on the product feed and the line item data, the recommendation server 130 can build a graph database 140. The graph database 140 can have a plurality of nodes that each represent one of a plurality of products. Each node can be associated with a unique product identifier. The product identifier can be a stock keeping unit ("SKU") in one example. However, the product identifier is not limited to a particular format and can be any unique identifier, certificate, or code.

The database 140 can form edges that represent relationships between the product nodes. Edges can have weight values that represent how strongly the products are associated at a particular store. The weight value can based on occurrences of the product identifiers with common store identifiers, invoice identifiers, and the customer identifiers. Additionally, store identifiers for related stores can be used to determine edge weight for a particular store.

Because the edge weight value represents a relationship for a particular store, two product nodes can have multiple edges between them with different values, representing different relationship strengths for different stores. Edges can be created for each store in an example. The first store can have a first edge between two related products, and a second store can have a second edge between the same two products. But the first and second edges can be weighted differently based on the relative strength of relationship between the two products at the first and second stores. Additionally, some product pairs might not have edge relationships for all stores. This can be the case when a second product is not sold at a first store but is sold at a second store.

The recommendation engine 138 can adjust the weight values of the edges based on a genetic algorithm. The genetic algorithm can determine similarities between stores regarding which products are sold together. This can allow the genetic algorithm to adjust weight values of the edges such that similar stores are more highly valued and dissimilar stores are less highly valued. Then the recommendation engine can use all edges from target product(s) to determine a product recommendation for the target store.

The recommendation server 130 can include one or more servers. Each server can include one or more processors that execute instructions stored on a non-transitory, computer-readable medium. The recommendation server 130 can include any number of servers and processors.

The user devices 110 and 111 and servers 130, 150 can each utilize one or more processors. The term "processor," as generally used herein, can refer to any logic processing unit, such as one or more central processing units ("CPUs"), digital signal processors ("DSPs"), application specific integrated circuits ("ASICs"), field programmable gate arrays ("FPGAs"), and similar devices. The processor can include one or more processors configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The user devices 110 and 111 and recommendation server 130 can also include an I/O module, such as a console with an integrated keyboard and mouse to allow a user to input parameters associated with system 100. An I/O module can also include a display including a GUI for outputting information on a screen.

Figure 2:
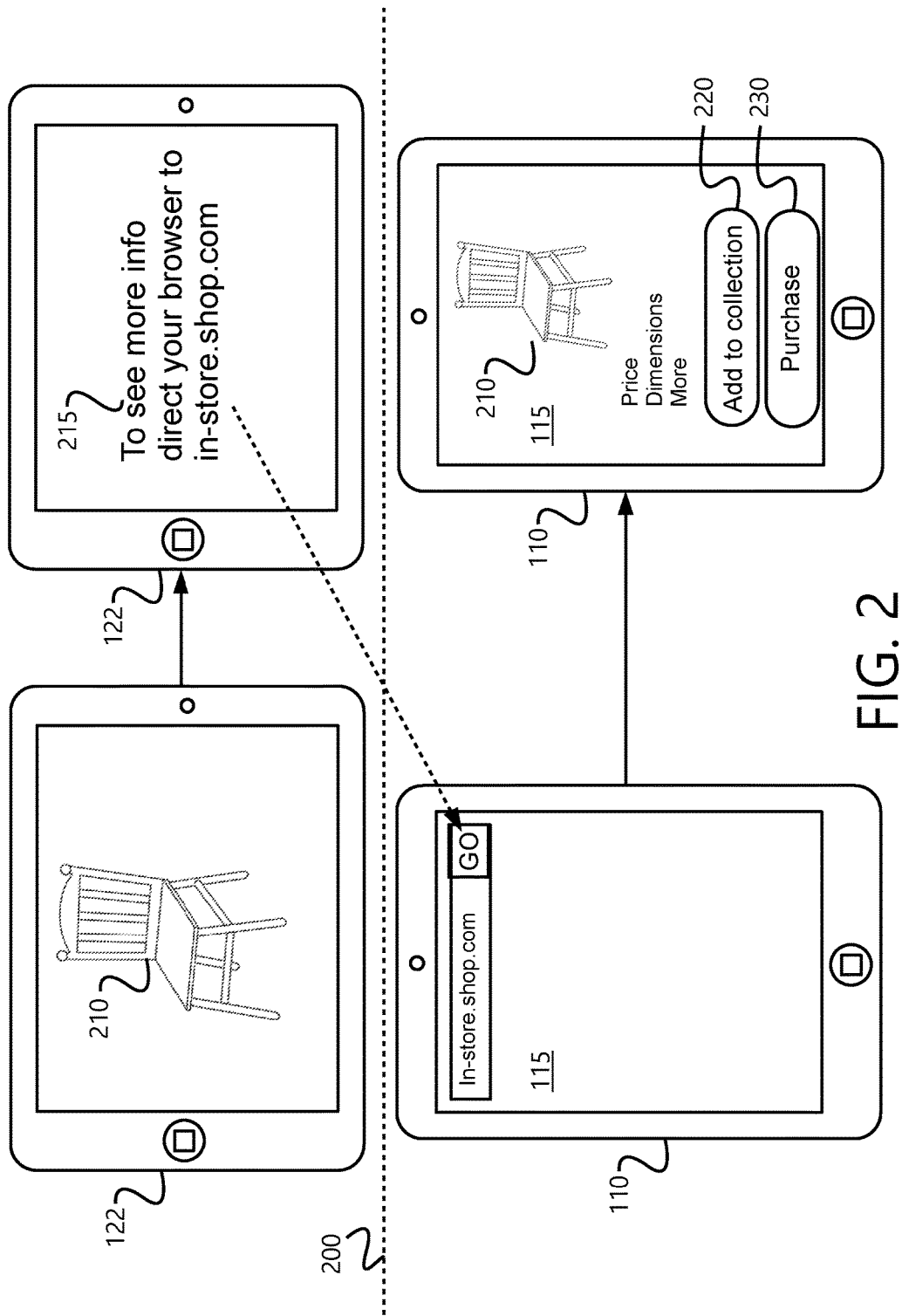
FIG. 2 is an exemplary illustration of system components.

FIG. 2 is an exemplary illustration of system components. In one example, a computing device 122 that is part of a tap wall 120 displays a product 210. When the user touches the screen of the computing device 122, it can send a message to the retailer server 150. The image can include a link to a URL at the server 130, 150. The URL can include a product identifier and a store identifier in one example. The URL can alternatively include a device identifier in one example. This can allow the server 130, 150 to determine which tap wall 120 or device 122 within a tap wall 120 has sent the message. The server 130, 150 can determine the product identifier by tracking which product is on which computing device 122 in an example.

The server 130, 150 can determine if an active user device 110 is associated with the tap wall 120 in an example. This can be done in one example by registering unique ultrasonic frequencies with user devices that contact the server 130, 150 at the short URL. The computing devices 122 of one or more tap walls can detect the frequency, allowing the server 130, 150 to determine which user device 110 is in front of which tap wall.

If no active user exists, the server 130, 150 can send a message back to the computing device 122 to cause it to prompt a user to connect to the short URL. The prompt 215 can list the short URL, which the user can type into a browser 115 of the first user device 110.

Once the first user device 110 connects to the server 130, 150 at the short URL, it can be associated with the tap wall. In one example, the server 130, 150 opens a socket connection with the first user device 110. The server 130 can assign a first ultrasonic frequency to the first user device 110. If a second user device 110 connects at the short URL, the server 130, 150 can assign a second ultrasonic frequency to it. The computing device 122 that was touched can detect an ultrasonic frequency and send that information to the server 130, 150. The server 130, 150 can determine which user device to associate with the tap wall based on whether the first or second ultrasonic frequency was detected.

In another example, the browser of the first user device 110 can detect a beacon and report the beacon identifier to the server 130, 150. This can allow the server 130, 150 to determine which tap wall the first user device 110 is interacting with.

In still another example, the short URL in the prompt 215 can be unique. For example, it can apply only to that tap wall 210 or a specific section of the tap wall 210 in which the computing device 122 resides. This can allow the server 130, 150 to determine the tap wall 120 or section where the first user device 110 is active.

After the server 130, 150 determines that the first user device 110 is active at the tap wall 120, the server 130, 150 can send product information to the browser 115 computing device 122. The product information can correlate to the product tapped by the user in the computing device 122.

In one example, the server 130, 150 can send a webpage to the browser 115 of the first user device 110 that includes the product information. The product information can include an image of the selected product 210 and additional details, such as price, dimensions, and other information. The webpage can include a first button 220 for adding the product to the user's collection. If the user selects this option, the server 130, 150 can store the product identifier in association with the cookie identifier of the first user device 110.

The webpage can also include a second button 230 for purchasing the product 210. This can allow the customer to purchase the product in-store without waiting in line at a cash register.

Figure 3A:
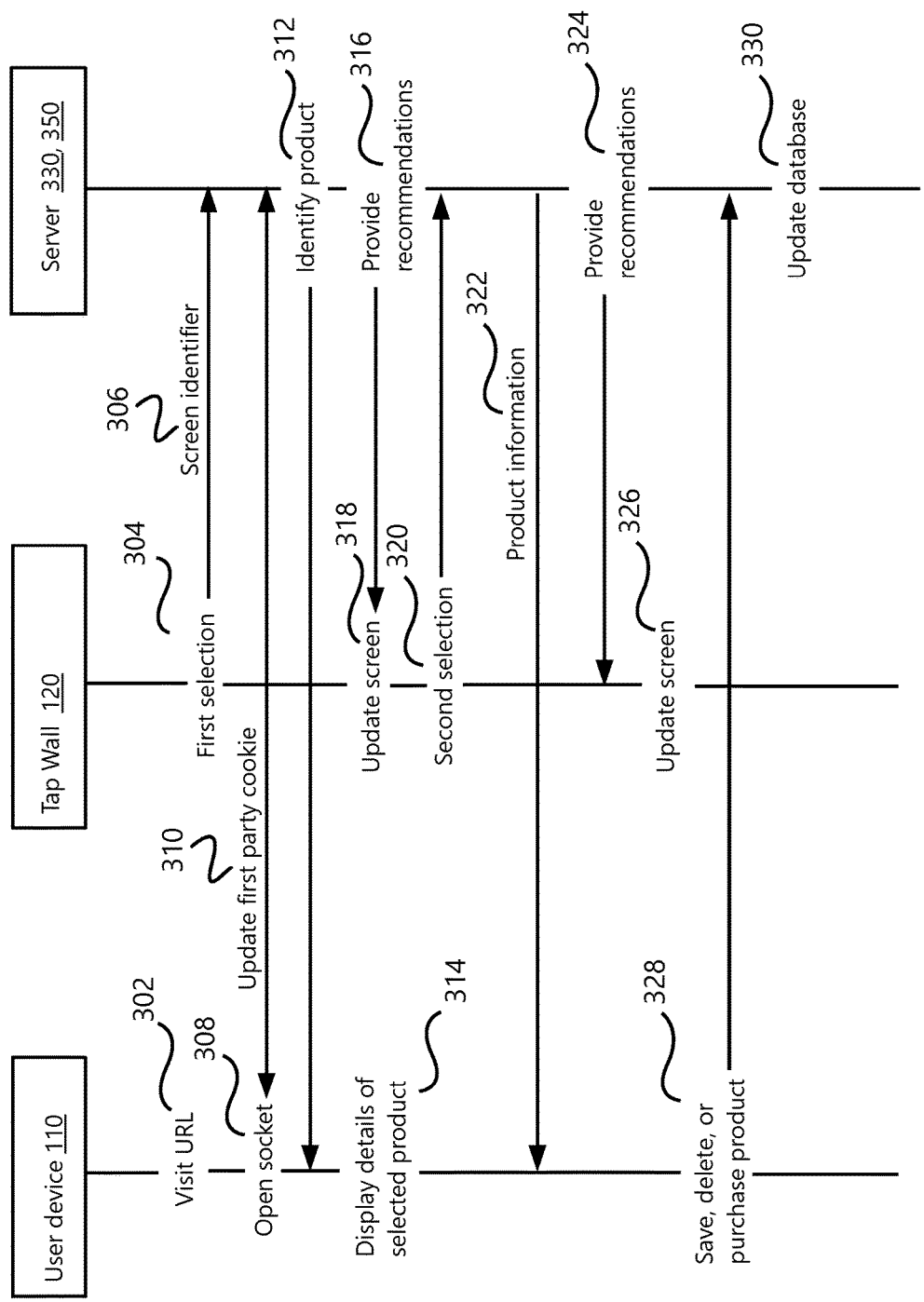
FIG. 3A is an exemplary flow chart of stages performed in a system.

FIG. 3A is an exemplary flowchart showing example steps performed in a system. In particular, interactions between the user device 110, tap wall 120, and server 130, 150 are shown. The server 130, 150 can include at least one of the recommendation server 130 and retailer server 150.

At stage 302, the user device 110 can navigate to the short URL 302. This can cause the user device 110 to contact the server 130, 150 and open a socket at stage 308. The server 130, 150 can treat the user device 110 as active with the tap wall 120. This can be based on the URL that was entered at stage 302, which can be unique to the tap wall 120.

In one example, the short URL is presented to the user after the user first touches the tap wall 120 at stage 304. The user can tap a product image, making a first product selection. The product image can be a link back to the server 130, 150. The link can be a URL that includes a screen identifier 306, which can allow the server 130, 150 to identify the product and the store at stage 312. This is because the server 130, 150 can track which product is displayed on which screen, and track which screens are in which stores.

Product information for the identified product can be sent to the user device 110. Using the open socket, the server 130, 150 can send a webpage to the browser of the user device 110. The webpage can contain the product information. The webpage can also include links for purchasing the product online or for storing the product in a collection associated with the user.

At stage 310, the server 130, 150 can update the first party cookie of the user device 110 by associating it with the selected product. In one example, updating the cookie can include contacting a retailer server 350 where the cookie store 152 is located. In one example, the server 130, 150 can contact the retailer server 150 in real-time. In another example, product associations are batched and reported together at some later time.

In still another example, the server 130, 150 reroutes the product link to the retailer server 130 by appending the cookie identifier associated with the user device 110. The retailer server 150 can store the product in the cookie store 152 for the cookie identifier. The retailer server 150 can also send other cookie information back to the recommendation server 130.

The recommendation server 130 can make product recommendations at stage 316. This can include selecting nodes that correspond to products in the cookie store 152. Using weighted edges and an iterative genetic algorithm, products commonly associated with those of the user device 110 can be selected.

At least one recommendation can be provided to the tap wall 120 at stage 316. In one example, the server 130, 150 determines a screen to populate based on the likelihood that the user will select a current product on the screen. In one example, empty screens are prioritized first. In another example, the next prioritized screens are those with products falling below a threshold relatedness to the selected product(s) based on the recommendation engine 138 (e.g., the genetic algorithm). In another example, recommended products are loaded into screens with statistically higher selection rates. The selection rates can calculated and maintained at the server 130, 150.

At stage 318, a screen of the tap wall 120 is updated to display the recommended product. The user can select this product at stage 320 by tapping the screen. The underlying link on the screen can cause the tap wall 120 to contact the server 130, 150 to report the selection. The server 130, 150 can determine that the first user device 110 is active at the tap wall based on the prior activation stages 302 and 308. As a result, the server 130, 150 can send a webpage with the corresponding product information to the user device 110 at stage 322.

The server 130, 150 can also make additional product recommendations at stage 324 based on the second selection. The second product can be provided as an input to the recommendation engine 138. At stage 326, another screen of the tap wall 120 can be updated based on the recommended product returned from the recommendation engine 138.

At stage 328, the user device 110 can present options to save or delete the second product or other products from a collection associated with the cookie identifier of the user device 110. An option to purchase the product at the retailer website can also be presented. These options can be part of a website provided to the user device via the open socket from the server 130, 150. Based on the user's actions, the server 130, 150 can update a database 330, such as the cookie store 152.

Figure 3B:
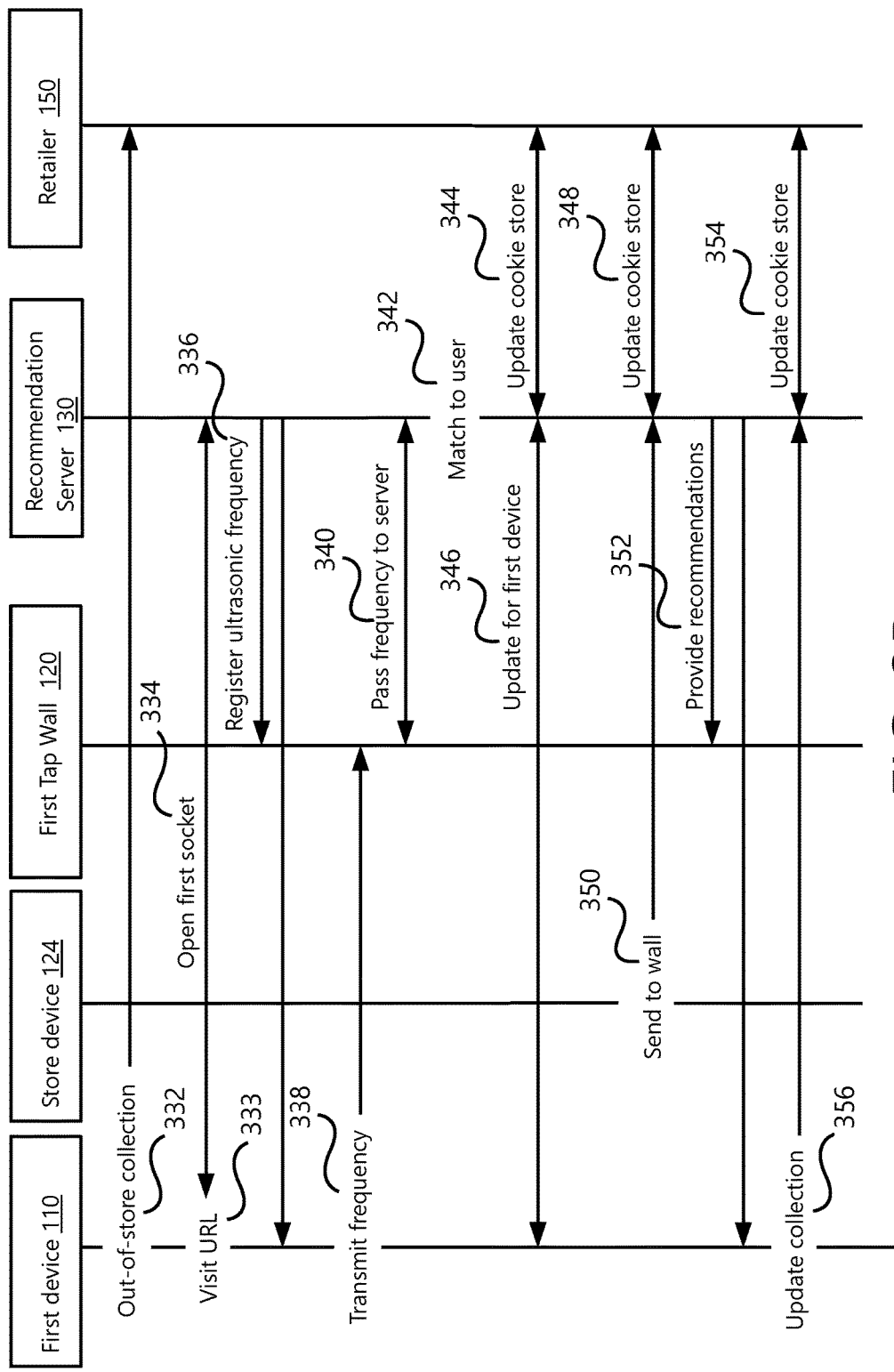
FIG. 3B is an exemplary flow chart of stages performed in a system.

FIG. 3B includes exemplary stages that incorporate ultrasonic frequencies for detecting active user devices 110 at a tap wall 120. In one example, a retailer can have multiple tap walls 120. These can be at different stores or the same store. As a result, the system may need to determine which user devices 110 are active at which tap walls 120.

At stage 332, a retailer server 150 can track products that the first user device 110 views before coming to a store or other tap wall 120 location. These products can be tracked in a cookie store 152 associated with the first party cookie that resides on the first user device 110.

To use the tap wall 120 in-store, the user can navigate the first user device 110 to a short URL at stage 333. As has been described, this can connect the first user device 110 to the recommendation server 130 or retailer server 150 by opening a socket. In this example, the URL connects the first user device 110 to the recommendation server 130 and opens a first socket at stage 334.

However, the recommendation server can similarly open sockets with other user devices. In order to determine which user device 110 is active at which tap wall 120, the recommendation server 130 can assign a first ultrasonic frequency to the first user device 110. This can include sending a webpage to the first user device 110 that continuously plays a sound at the first ultrasonic frequency. The ultrasonic frequencies can be above the threshold for ordinary human hearing. However, ultrasonic frequencies can still be detected by microphones of computing devices in the tap wall 120, such as tablets.

In one example, the recommendation server 130 also notifies the tap wall 120 of the first ultrasonic frequency. This can allow the tap wall 120 to listen specifically for the first ultrasonic frequency and report to the server 130 or 150 when the first ultrasonic frequency is detected. This can allow the server 130, 150 to determine that the first user device 110 is active at the first tap wall 120. In another example, the server 130 does not notify the tap wall 120 of specific frequencies. Instead, the tap wall 120 devices report any ultrasonic frequency that is detected above a threshold loudness, and the server 130, 150 determines whether it matches any of the ultrasonic frequencies assigned to user devices 110.

At stage 338, the first user device 110 can transmit the first ultrasonic frequency. The sound transmission be controlled by JavaScript or a website loaded in the browser via the open first socket. A device, such as a tablet, in the tap wall 120 can detect the ultrasonic frequency and send a message to the server 130, 150 at stage 340. The message can indicate a frequency detected by the tap wall 120 in an example.

At stage 342, the server 130, 150 can match the ultrasonic frequency to a user (e.g., to the cookie identifier that was assigned the ultrasonic frequency). In this example, detecting the first ultrasonic frequency causes the server 130, 150 to identify the first user device 110 as active at the tap wall. If a different ultrasonic frequency is detected (or if a touch occurs without the first ultrasonic frequency being detected), the server 130, 150 can attempt to determine a new active device at the tap wall 120 or issue a prompt for the user to navigate to the URL on their phone.

As long as the first user device 110 is active, the user can tap product images on the tap wall 120 and the user's collection can be updated at stage 245. This can include associating the selected products with the user's cookie 112. To do this, the recommendation server 130 can send a message to the retailer server 150 at stage 344, causing the retailer server 150 to add the selected product to the cookie store 152.

At stage 350, a sales agent can use a store device 124 to send a product to the tap wall 120. In one example, the store device 124 does not need to be paired with the user device 110 to perform this function. The store device 124 can execute an application that allows the sales agent to select a particular product for inclusion on the tap wall 120. The store device 124 can issue a send-to-wall message to the recommendation server 130. The recommendation server 130 can send a new page to the tap wall 120 for displaying the selected product.

In one example, the recommendation server 130 also sends a message for the retailer 150 to update the user's cookie store 152. This can allow the sales agent to associate products with the user. For example, if the sales agent sees the user looking at particular products on the shelf, the agent can report those products to the server 130, 150 for association with the user.

This can allow for even more relevant recommendations at stage 352. The recommendation engine can utilize the products selected by the store device 124 to determine other products to recommend to the user. These recommended products can be sent to the tap wall 120 in an example. The can also or alternatively be sent to the first user device 110, such as in a webpage via the first socket.

At stage 356, the user can update their collection. This can include adding or removing recommended products. The user device 110 can execute a webpage from the server 130, 150 in order to do so. As a result, at stage 345, the server 130, 150 can update the cookie store based on the edits made to the user's collection.

Figure 3C:
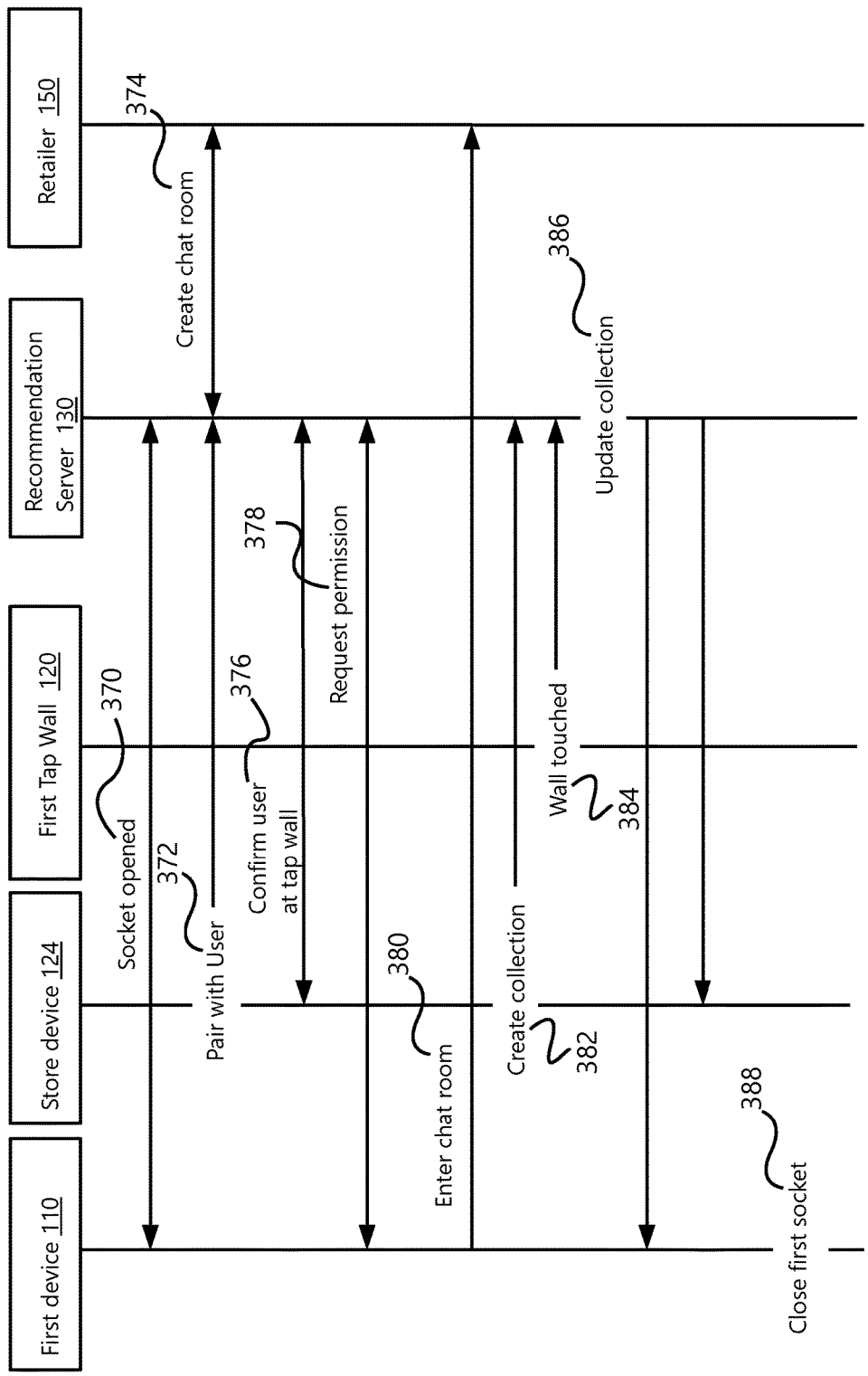
FIG. 3C is an exemplary flow chart of stages performed in a system.

FIG. 3C illustrates exemplary steps performed in a system with regard to an additional scenario involving the pairing of a store device 124 with a user device 110. As has been described, the first user device 110 can connect via a socket to the recommendation server 130 at stage 370.

At stage 372, the store device 124 can request pairing with the user. The pairing can be requested based on an active user at the tap wall 120. The recommendation server 130 can open a chat room, which can be hosted at the retailer server 150. Then, both the store device 124 and first device 110 can be sent JavaScript or a webpage that causes both devices to enter the chat room at stage 374.

In one example, at stage 376, the recommendation server 130 sends a message to the store device 124 to have the sales agent confirm that the user is at the tap wall 120. Based on this confirmation, at stage 378, the recommendation server 130 can send a request to enter the chatroom to the first user device 110 by using the socket.

At stage 380, the user can select an option on the webpage of the first user device 110 to cause the first user device 110 to enter the chat room. The chat room can be a shared session that allows the sales agent and user to both edit the user's collection in one example. Both the sales agent and user can control the webpage and see the same thing on both devices 110 and 124.

At stage 382, the sales agent can create a collection for the first user on the store device 124. The first device 110 can display what the sales agent is doing in the shared session (i.e., chatroom). At stage 384, the first user can touch a product image on the tap wall 120. The product information can be sent from the server 130, 150 to the shared session in one example. This can allow the user or sales agent to update the user's collection at stage 386.

At stage 388, the user can close the connection by closing the browser.

Figure 4:
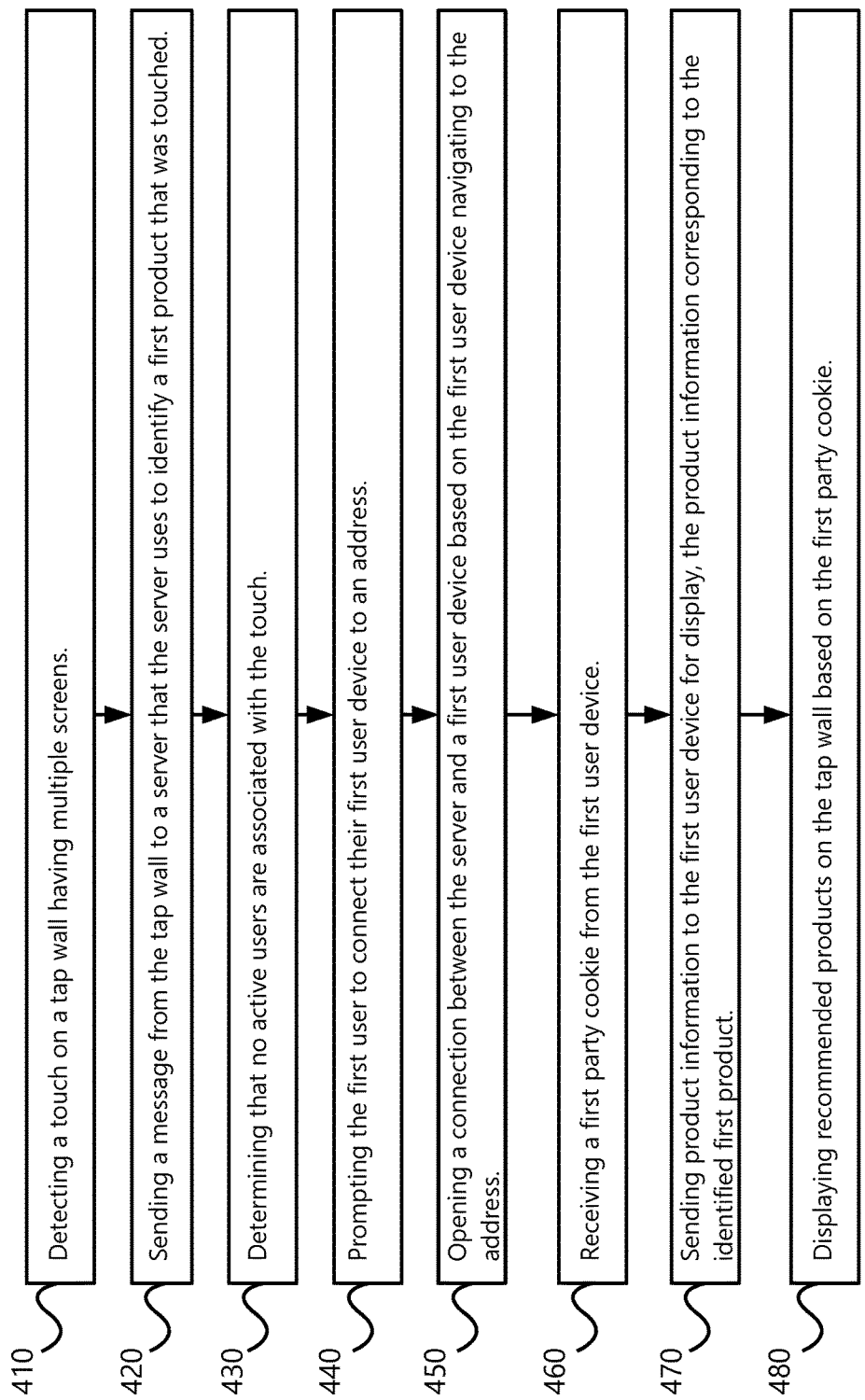
FIG. 4 is an exemplary flow chart of stages performed in a system.

FIG. 4 is another exemplary illustration of stages performed by a system. At stage 410, the tap wall 120 detects a touch on one of multiple screens. The screens can be graphical division on a single device, or multiple different computing devices 122, such as tablets.

At stage 420, the tap wall 120 can send a message to the server. The computing device 122 that is touched can send the message in one example. The server 130, 150 can identify the product that was touched based on the message. In one example, the message includes a device identifier. The server 130, 150 can determine the computing device 122, tap wall 120, and store from the device identifier.

At stage 430, the server 130, 150 can determine that no active user devices 110 are associated with the identified tap wall 120. The server 130, 150 can track active user devices 110 in an example. In another example, beacon technology, NFC, or frequency detection can be used to determine the presence of a user device 110 that has an open socket.

At stage 440, the server 130, 150 can send a message to the tap wall 120 causing the tap wall 120 to prompt the user to visit an address, such as a URL. The URL can direct the user device 110 to the server 130, 150. This allows the server 130, 150, at stage 450 to open a connection between the server 130, 150 and a first user device 110 at stage 450.

The connection allows the server 130, 150 to receive a first party cookie 112 from the user device at stage 460. The cookie 112 can include an identifier that the server 130, 150 can associate with a cookie store 152 where product history has been tracked for the user. The tracking can include a collection of products procured by the user or a sales agent.

The connection also allows the server 130, 150 to send product information to the first user device for display. The product information can be part of a webpage sent through the socket connection. The product information can correspond to the identified first product that was tapped in stage 410.

In addition, at stage 480, the tap wall 120 can display recommended products. The recommended products can be determined based on the products selected by the user and the store associated with the tap wall 120. One or more products associated with the first party cookie of the first user device 110 can be sent to a recommendation engine 138. The recommendation engine 138 can return recommended products. In one example, products falling below a threshold relatedness to the user's products according to the recommendation engine 138 can be replaced with recommended products.

The following discussion focuses on the relationships between products and the operation of the recommendation engine 138.

Figure 5A:
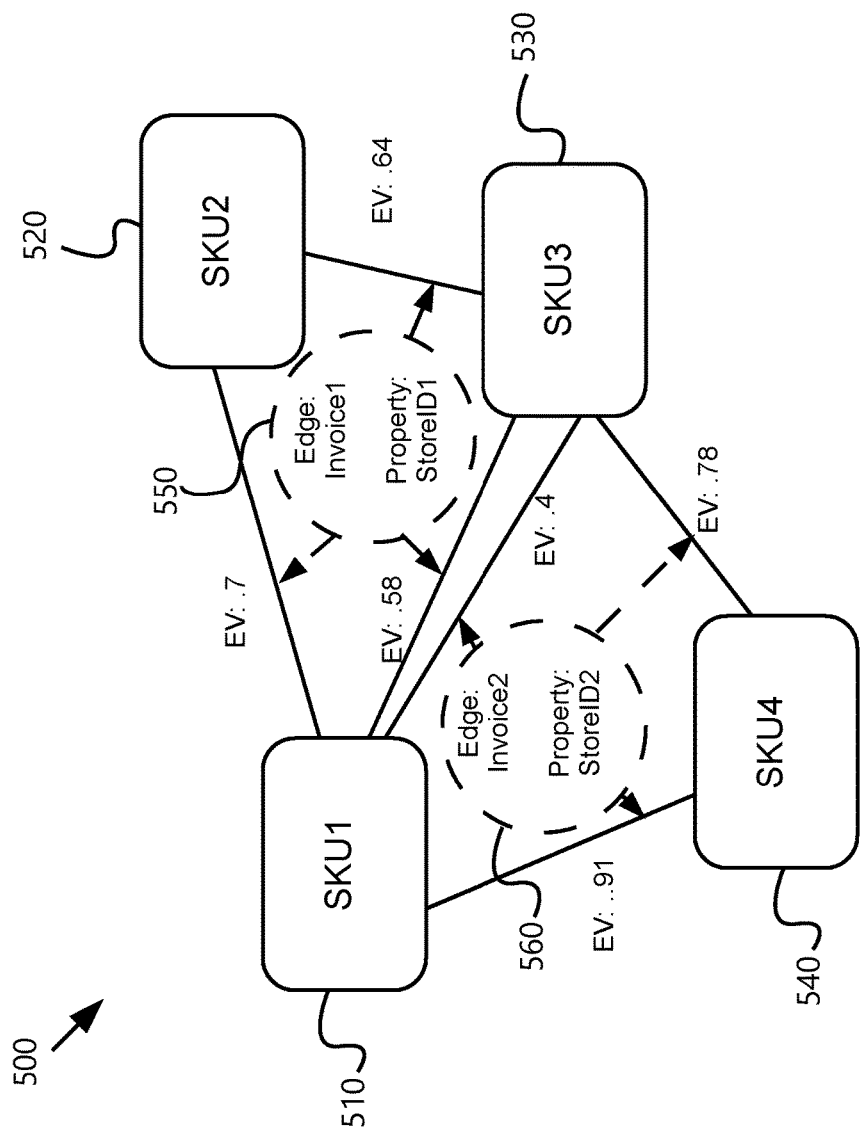
FIG. 5A is an exemplary graph of relationships used in a genetic algorithm.

FIG. 5A is an exemplary illustration of a graph database 500 relationships. In this example, four nodes 510, 520, 530, and 540 are pictured. Each node 510, 520, 530, and 540 is associated with a product. In this example, a first node 510 is associated with a first SKU, a second node 520 is associated with a second SKU, a third node 530 is associated with a third SKU, and a fourth node 540 is associated with a fourth SKU.

The graph database 500 can represent relationships between products for a first store with a first set of edges 550. The edges 550 can be based on invoices from the first store. In this example, the edges 550 form associations between the first and second nodes 510 and 520, second and third nodes 520 and 530, and first and third nodes 510 and 530.

In one example, the recommendation engine 138 builds the edges 550 based on the products being purchased together, as indicated by a first invoice. For example, the first invoice can include a store identifier that is associated with the first store. The first invoice can also include product identifiers for the first, second, and third products 510, 520, and 530, indicating that a customer purchased the three products together. In another example, edges can be formed based on a different relationship, such as related products by user or by date range.

A separate set of edges 560 can be created for a second store. This second set of edges 560 represent products that are together in an invoice from a second store, and can differ from the first edges 550. For example, an invoice associated with the second store can include the first, third, and fourth products 510, 530, and 540.

Figure 5B:
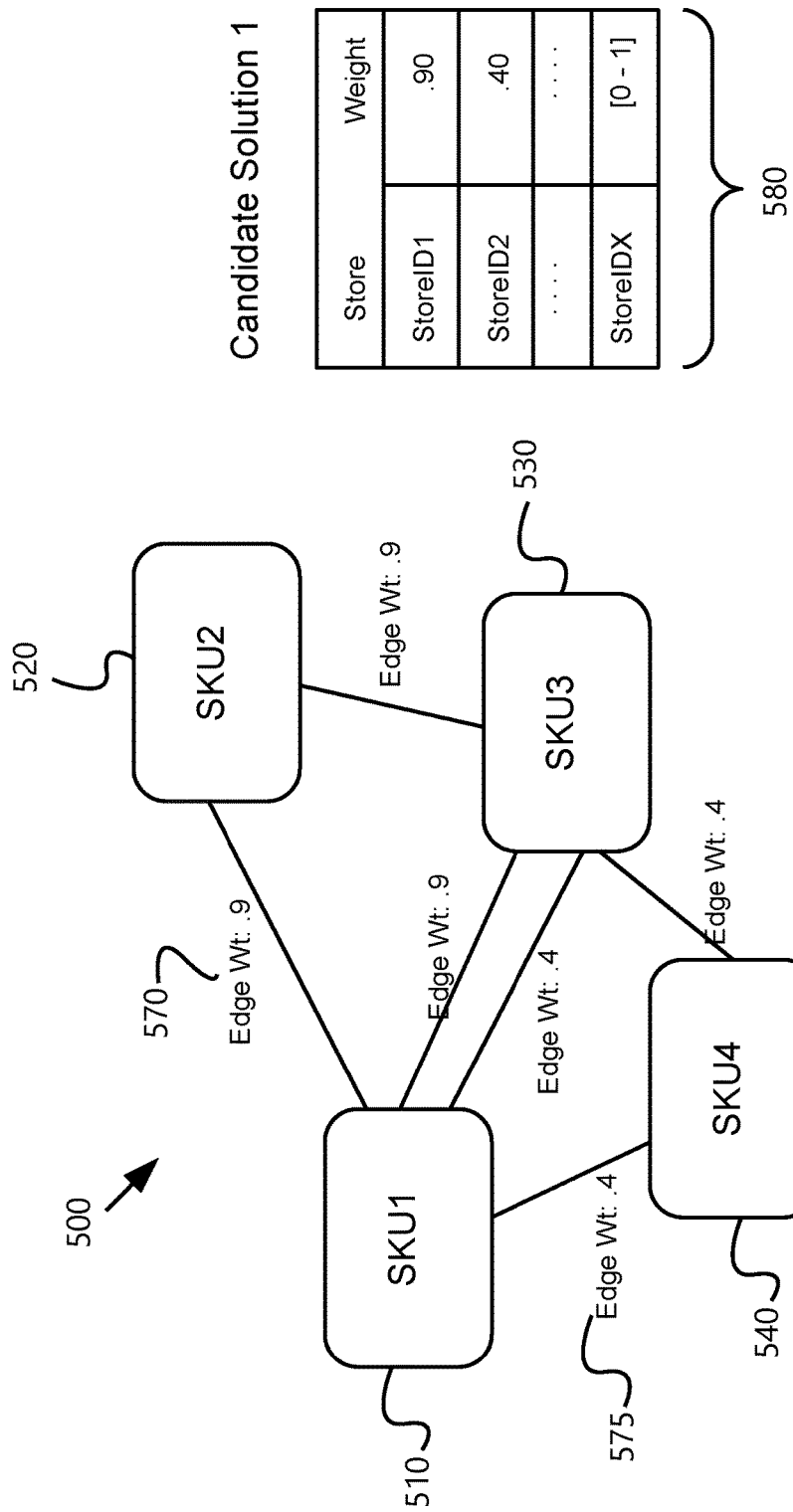
FIG. 5B is an exemplary graph of relationships used in a genetic algorithm.

As shown in FIG. 5B, each edge in the graph database 500 can be impacted by a second weight value 570, 575. The second weight value can be between 0 and 1 based on the similarity of the target store to the other stores, with 0 indicating very little or no relationship and 1 indicating a very strong relationship. In this example, the candidate solution 580 includes a second weight of 0.90 for a first store identifier, and a second weight of 0.40 for a second store identifier. The candidate solution 580 can be an array of numbers, which each value in the array corresponding to a different store identifier.

The illustration of FIG. 5B can represent a first candidate solution 580 that is one of many candidate solutions. The first candidate solution 580 can be compared against the other candidates that are generated iteratively based on other store data. The other candidates can include different edges with different weight values. The top candidates can continue to crossover or otherwise mate until a threshold commonality between candidates is reached. The crossover point for swapping values between candidates can be randomly selected. In one example, mutation is used instead of crossover. In that example, the parent candidates are mutated by changing one or more values within the candidate to produce a new child candidate.

At each iteration, the resulting candidates above a threshold commonality are retained and the others are eliminated. The threshold can be 60 percent in one example. A new set of randomly generated candidates are then added and the process repeats. Once a certain percentage of the candidate solutions are common, the algorithm iterations can end and the common solution is selected as the top candidate solution 580.

When the top candidate solution 580 is determined by the genetic algorithm, it 580 can be stored in memory a the recommendation server 130. Then, when a recommendation request is received for the target store, the associated candidate solution 580 for that target store is retrieved. The weights 570, 575 of the top candidate solution 580 can be applied to the edge values (i.e. first weights) linked to the target product in the graph database 500.

Applying weights of the top candidate solution 580 to edge values can be explained with regard to the example of FIGS. 2A and 2B. In this example, a second weight 570 value of 0.9 is applied to the first set of edges 550, and a second weight 575 of 0.4 is applied to edges 560. Applying the weights 570, 575 to the edge 560, 265 values can include multiplying the edge 560 value by the weight 570. As shown in FIG. 5A, the edges 560 can have a first edge value of 0.91, a second edge value of 0.78, and a third edge value of 0.4. These edge values represent the connectedness of SKU1, SKU3, and SKU4 at StoreID2. The candidate solution 580 has a weight of 0.40 for StoreID2 relative to the target store of the recommendation request. To apply the weight, the edge values of edges 560 can be multiplied by 0.40 in one example, yielding weighted values of 0.364, 0.512, and 0.16. Conversely, the weight of 0.9 for StoreID1 indicates that StoreID1 is more similar to the target store. The edges 550 of StoreID1 can therefore be multiplied by 0.9, resulting in 0.63, 0.576, and 0.522.

As a result, the edges 550 of StoreID1 may be more heavily influential in picking recommended products for the target store than the edges 560 of StoreID2. If the target product is SKU1, in this example the recommended products can include SKU3. SKU3 has a total weighted edge value of 0.682, calculated from (0.58)*(0.90)+(0.40)(*0.40). However, the next recommended product would be SKU2 (with a weighted edge value of 0.63. This is the case even though SKU1 is more strongly associated with SKU4 at StoreID2 than SKU1 is associated with SKU2 at StoreID1. The weighting of the genetic algorithm can help tailor a recommended product in a way that would be unexpected and more accurate for the target store than relying on the graph database 500 alone.

Although the graph database 500 of FIG. 5A is simplified for explanation, with only four products and two stores, much more complex graph databases 500 are possible. Thousands of products and stores can be mapped with edges and nodes in this manner. The edge values for two products at a single store can be based on the propensity for the two products to be purchased together at that store. This can be calculated based on line item sales data for that store, which can include invoices that are more recent than a threshold past date.

Line item sales data associated with the example of FIGS. 2A and 2B is shown in FIG. 5C. Table 590 represents line item sales data. Any or all of the columns in the table 590 can act as indexes. The first column, Store ID, can be a store identifier that indicates which store associated with the sales data. Using the store identifier, the recommendation server 130 can retrieve other information about the store. For example, a store table can include location information for the store. It can also include a store group identifier. Stores can be grouped according to common ownership in one example. This can allow the system to build recommendations based on other stores of the same franchise.

The line item sales data can also include an invoice identifier. In one example, invoices received from stores are given unique invoice identifiers. Tracking an invoice can allow the system to determine which products have been purchased together. When multiple products are commonly found in the same invoice, this can show that a relationship between the products exists. This can be valuable in determining which products to recommend based on a target product.

The line item data can also include a sale date. This can indicate when the sale took place. In one example, only sales meeting a threshold recency are used by the recommendation server 130 in building the edges 550, 560 and calculating the edge values of the graph database 500. Because relationships between products can change over time, creating edge relationships based on sale date ranges can make the product relationships of the graph database 500 more accurate.

Continuing with FIG. 5C, the Item SKU can indicate which product was sold. The Item SKU can serve as a node in one example. By associated unique product identifiers with nodes, it is possible for the graph database 500 to determine edge relationships based on the other data that is common to different products.

The product identifiers can also be linked to a product feed in one example. The product feed can include a list of available products at a store. In one example, the database 140 collects information regarding available products. Participating stores can upload product feed information to the database 140 daily, such as from retailer server 150. The retailer server 150 can contact the recommendations server 130 using an application programming interface ("API") call or a file transfer protocol ("FTP") transfer. Alternatively, the recommendation server 130 can contact the retailer server 150 using an API call, and receive the most recent product feed.

The information in the product feed can be used to ensure that only available products are recommended at a store in one example. The recommendations can be based on which products are in stock at the particular store or at the company level (e.g., in a warehouse or at a different one of the company's stores).

The line item sales data can also include a quantity of items sold. The quantity can be used to add additional weight to edges from a product in one example. For example, if a customer tends to buy multiple of an item, the edge value can be slightly increased based on the average quantity.

The line item sales data can further include a customer identifier. This can indicate which customer purchased the item. This can allow the system to determine relationships between products based on separate purchases by the same customer. A new set of edges can be created based on this relationship.

In one example, line item sales data is received daily into the recommendation server 130, such as from the retailer server 150. In another example, line item data can be received at the recommendation server in real-time, such as when a store device 124 completes a sale. The recommendation server 130 and retailer server 150 can communicate through API calls in an example. This can allow the retailer server 150 or store device 124 to upload the line item sales data to the recommendation server 130 in one example. In another example, the recommendation server 130 can request the line item sales data from the retailer server 150.

In one example, the recommendation engine 138 utilizes a genetic algorithm to train the graph database 500. The genetic algorithm attempts to maximize a sum of centrality of a set of recommendations based on the line item sales data. The maximization is accomplished by adjusting weight values applied to the store identifier edges within a training dataset. The training dataset can include a subset of the total line item sales data that is available.

The genetic algorithm can utilize a genetic representation of each candidate solution. This can be an array of numbers in one example, representing potential weights between a target store and other stores. The initial set of candidate arrays can be randomly generated in an example.

The genetic algorithm can also utilize a fitness function to evaluate the candidate solutions. The candidate solutions that pass the fitness function can be retained, while the rest are thrown out. In one example, the fitness function includes scoring each candidate array against a sample of invoices (e.g., line item sales data). The fitness function can test the arrays against relationships in the sample line item sales data. For example, one fitness function can be based on products that are found together in invoices for each store. Another fitness function can include comparing against products bought by the same customer within a threshold number of days apart. In one example, the fitness function includes preserves the top 40% most common relationships.

The retained candidate solutions can then be manipulated according to the genetic algorithm. In one example, a crossover function is used. Crossover can include swapping the upper and lower portions of the candidate solutions. Crossover can be repeated until all of the candidate solutions have been changed. Crossover can be randomized such that the point at which crossover occurs along the candidate array changes. For example, if there are 5000 stores in the database, the candidate solutions can have an array size of 5000. The crossover point along the array can be at 1900 in one iteration of the genetic algorithm, and then change to 1540 in another iteration. Alternatively, each part of candidate solutions that swaps values during crossover can have a randomized crossover point.

Additional solutions can be randomly generated and the process can repeat for multiple iterations. The iterations can end after a maximum number of iterations is reached or when a maximum mean correlation coefficient is achieved between the candidate solutions.

In one example, the recommendation engine calculates the Laplacian eigenvalue of centrality of the retrieved edges. In one example, the recommendation engine 138 only keeps the candidate solutions that exceed a threshold value for the Laplacian eigenvalue. The recommendation engine 138 can then remove the other candidate solutions. The remaining candidate solutions can be supplemented with additional randomly generated candidate solutions and the process can repeat for another iteration.

When the candidate solutions reach a predetermined commonality or a max number of iterations has occurred, the top candidate solution can be stored in association with the store identifier for which it was generated.

This process can be carried out for each store in the database such that each store has a top candidate solution that contains relative weights for all the stores. The top candidate solutions for each store (i.e., retailer) are then stored in database 140.

The graph database 500 and stored top candidate solutions allow the recommendation engine 138 to make product recommendations. A recommendation request can originate from a target store, and identify the target store and at least one target product. The target products can be products that the user has browsed at the store or online, or otherwise indicated interest in to a sales agent. The target store can be represented by a store identifier and the target product(s) can be represented by product identifiers.

Using a target product identifier, the recommendation engine 138 can locate the corresponding product node in the graph database 140. The recommendation engine 138 can retrieve the edges associated with the store identifier that are connected to the identified product node. The edges are connected to additional connected products that are candidates for recommendation. The edge values of the edges can be manipulated by the weight values of the top candidate solution that corresponds to the target store. The resulting weighted edge values can be used to determine which of those products to recommend.

The recommendation engine 138 can compare the subset of connected products to the product feed for the store, in one example. The product feed can indicate all products that are active and potentially available through the store. If a product is not active, then it is removed from the subset of connected products.

Additionally, active products that are not in inventory can also be removed from the connected products. The decision of whether to remove active but currently unavailable products can be based on a retailer setting. This can allow the retailer to control whether to recommend unavailable products. In one example, the target product is compared against the product feed, which can indicate unit availability. The inventory can be based on the specific store's inventory in one example. In another example, company-wide inventory is considered. Based on the retailer setting, products that are not in inventory can be removed from the connected products.

The recommendation engine 138 can sort the remaining connected products based on the centrality measurement, from highest to lowest. The highest-sorted products can be returned from the recommendation engine 138 to the requestor (e.g., the store device 124 or the user device 110).

The recommendation request can specify a quantity of products to recommend in one example. For example, based on a target product, the app 125 or retailer web site can be configured to request three additional recommendations. In that example, the recommendation engine 138 can return the top three rated connected products.

The recommendation request can also include more than one target product in an example. For example, the user might have requested more information on three different products. In one example, the user can scan tags for those products on a shelf at the store, such as by placing their user device 110 in proximity to a RFID tag. In another example, a sales agent can manually enter the products that a customer has indicated interest in into the app 125 or website. Those multiple products can be target products in the recommendation request.

When the recommendation request includes multiple target products, the recommendation server 130 can retrieve the edges associated with each of the target products. The recommendation server 130 can also retrieve the top candidate solution for the target store. The weights can be applied to the edge values, and the resulting weighted edge values can be considered for each product. In one example, this includes summing all the weighted edge values for each product. This can favor recommendation of products that are strongly connected to multiple of the target products, based on the weights of stores with common sales patterns.

Figure 6:
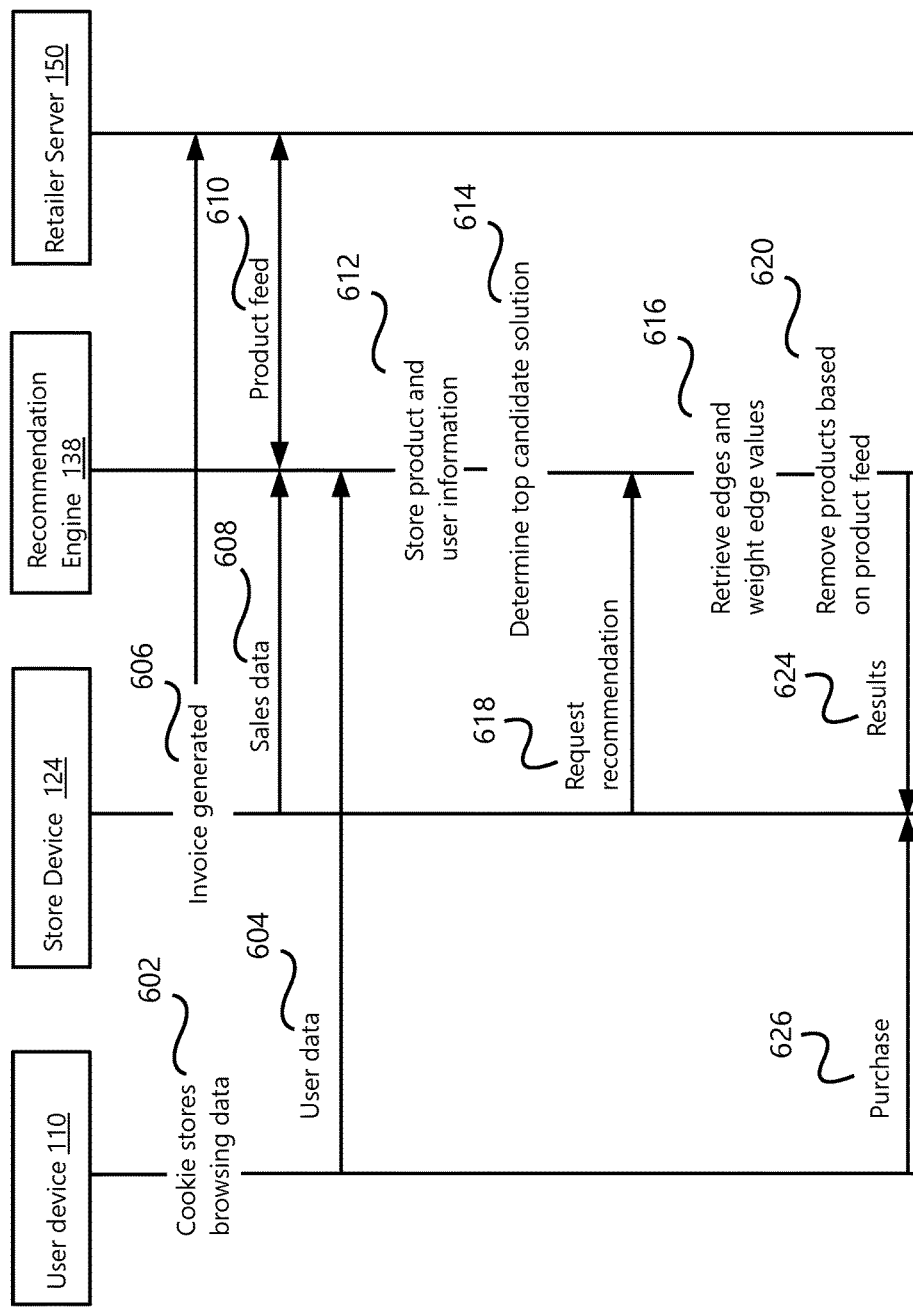
FIG. 6 is an exemplary flow chart of steps performed in a system.

FIG. 6 illustrates an example method performed by a system. At stage 602, the user device 110 can store browsing data in a cookie. The cookie can store product information for products browsed by the user on the user device 110. In one example, the customer is directed to a URL for the store based on an in-store activity. For example, to gain more information about a product in the store, the customer can scan a tag using the user device 110. The tag can direct the user device 110 to a URL associated with the store. In one example, the website is in communication with the recommendation engine 138.

The cookie contents can be accessed by the website and sent to the recommendation engine 138 at stage 604. The recommendation engine 138 can parse the cookie information to detect products. These products can be tied to product identifiers in the database 140 and entries linking the user to the products can be added to the graph database 140 at stage 612.

At stage 606, the store can generate an invoice. This can be done on the store device 124 in an example, such as by checking out a customer. In another example, product info is entered into the store device when a sales agent identifies products that the customer is interested in. Both types of data can be sent to the recommendation engine at stage 608. In one example, the sales information sent to the recommendation engine 138 is line item sales data.

At stage 610, a retailer server 150 can send a product feed to the recommendation engine 138. This can be done nightly in one example. In another example, as product inventory is updated at the retailer server 150, updates are replicated to the recommendation engine 138. The retailer server 150 can be loaded with a public key used for communicating with the recommendation engine 138. The retailer server 150 can supply the key and make API calls to update the product feed at the recommendation engine 138.

At stage 612, the product, sales, and user information received from the user device 110, store device 124, and retailer server 150 are stored in a database 140. This information is used by the recommendation engine 138 to train a graph database having nodes that represent products. The edges between products can represent product associations for particular stores. Edge values can be calculated based on the frequency and strength of the association at the particular store.

For example, a subset of total invoices from a first store can be analyzed to graph each invoice, creating product nodes and edges between the nodes for that store. The most common edges are compiled to generate a value for an edge between those products. A value closer to 1 than to 0 can indicate a relatively more common relationship. This process can be repeated at various time intervals by graphing additional invoices and compiling the results.

At stage 614, recommendation engine 138 can execute a genetic algorithm to determine a top candidate solution for each store. The candidates can be arrays of numbers between 1 and 0 that represent similarities between a first store and other stores. Each number in the array can represent commonality of a particular store identifier. For example, the first cell in the array can represent the weight of a first store, and the $n^{th}$ cell in the array can represent the weight of the $n^{th}$ store.

At stage 618, the recommendation engine 138 can receive a recommendation request. The recommendation request can identify the store (with a store identifier) and target product(s) (with product identifier(s)). The recommendation request can also identify a number of recommendations that the recommendation server 130 should return.

At stage 616, the edges associated with the target product(s) are retrieved. The edge values are manipulated based on the weight values of the top candidate solution for the target store. The weighted edge values allow the recommendation engine 138 to rank the products for recommendation.

At stage 620, the recommendation engine 138 can eliminate products for recommendation. Products are removed based on active status, availability, and redundancy with the target products.

The top-ranked remaining products are used as the results 624. The number of resulting products 624 can be specified in the recommendation request 618. For example, if three product recommendations are requested, the top three remaining products are returned as the results 624. These resulting recommended products can be displayed at the requesting device 110 or 124. Those products can be purchased by the customer at stage 626.

FIG. 7 is an illustration of example stages performed in a system. At stage 710, the recommendation server 130 can receive sales data and a product feed. Optionally, user browsing information can be received at stage 720.

This information can be used to train a graph database at stage 730. Nodes can be created for each unique product in the product feed. Edges can be created between products based on sales data (e.g., products sold together in an invoice). Edges can be created separately for each store.

At stage 740, a genetic algorithm can create top candidate solutions for the stores. The top candidate solutions can be arrays of weights that represent how similar each store is to a target store.

At stage 760, the recommendation server 130 can receive recommendation request based on a store identifier and at least one product identifier. The request can come from a user device 110 or a store device 124. The request can also identify multiple target product identifiers and/or specify the desired number of results (i.e., recommended products).

At stage 770, the recommendation server 130 can rank the recommendations. To do this, the edges associated with the target product(s) are obtained. The edge values for each product are manipulated by the weights in the top candidate solution for the target store. The resulting weighted edge values can be summed for each store in an example. Additionally, products can be removed from the list of recommendation candidates based on inventory data at the target store, such as product status and availability at the store. The remaining top rated result(s) can be returned as product recommendation(s) to the requesting device 110 or 124 at stage 780.

Other examples of the disclosure will be apparent to those skilled in the art from consideration of the specification and practice of the examples disclosed herein. The examples are not limited to a particular genetic algorithm unless otherwise specified. Also, although stores are discussed as examples, the term "store" and "retailer" are not meant to be limiting. "In-store" can be outside and is not limited to a particular type of building. A user standing at a physical tap wall is considered to be "in-store."

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for making in-store recommendations to anonymous users, the system comprising:

a tap wall including plurality of screens, wherein the plurality of screens are populated to include images of products available from a store, the tap wall receiving a touch on a first screen from a first user;

a server having a processor and a non-transitory, computer-readable medium, wherein the server populates the plurality of screens of the tap wall, and wherein the server performs stages including:

receiving a message from the tap wall in response to the touch, the message including an identifier that the server uses to determine a first product was touched;

opening a connection with a first user device based on the first user device navigating to an address associated with the server, wherein the address is provided to an anonymous user of the first user device;

sending product information to the first user device regarding the determined first product that was touched;

receiving a first party cookie from the first user device;

determining products associated with the first user device based on the first party cookie; and populating a second screen in the tap wall based on at least one of the determined products.

2. The system of claim 1, the server performing further stages including:

determining that no active users are associated with the touch;

sending a message from the server to cause the tap wall to provide the address to the anonymous user;

in response to the first user device connecting to the server at the address, receiving a first party cookie from the first user device, the first party cookie including a product identifier for a second product that was viewed online; and storing the first and second products in a collection associated with the first user device.

3. The system of claim 1, the server performing further stages including:

using the at least one of the determined products as an input to a recommendation engine; and sending a link to an image of a recommended product to the tap wall to cause the recommended product to display in the second screen.

4. The system of claim 1, the server performing further stages including:

associating a first ultrasonic frequency with the first user device;

sending a message to the first user device causing the first user device to emit sound at the first ultrasonic frequency;

receiving a communication from the tap wall indicating that a microphone in the tap wall received the first ultrasonic frequency;

based on distinguishing the first ultrasonic frequency from a second ultrasonic frequency associated with a second user device, determining that the first user device is active at the tap wall; and sending the product information to the first user device.

5. The system of claim 1, the server performing further stages including:

receiving a pairing request from a store device;

determining that the first user device is active at the tap wall;

receiving a second product to add to a collection associated with the first user device; and updating a cookie store associated with a first party cookie on the first user device, the cookie store being updated to include the second product.

6. The system of claim 1, the server stages further comprising:

receiving a recommendation for a second product from a sales agent, wherein the recommendation is sent from a store device that identifies the sales agent;

sending a link to the second product to the tap wall, the link including a sales agent identifier for the sales agent;

receiving a second message from the tap wall indicating that the second product was selected;

adding the second product and sales agent identifier to a cookie store associated with a first party cookie on the user's device receiving a sale of the second product on a website that uses the first party cookie;

determining that the sales agent recommended the second product based on linking information in the first party cookie to the cookie store; and crediting a sales commission to the sales agent.

7. A non-transitory, computer-readable medium containing instructions executed by at least one processor to perform stages for linking in-store and out-of-store interactions of an anonymous first user, the stages comprising:

a tap wall including plurality of screens, wherein the plurality of screens are populated to include images of products available from a store;

detecting a touch on the tap wall, the tap wall including at least a first tap wall device where the touch is detected;

sending a message with an identifier from the tap wall to a server that the server uses to identify a first product associated with the touch;

prompting the first user to connect their first user device to an address;

opening a connection between the server and a first user device based on the first user device navigating to the address, wherein the address is provided to an anonymous user of the first user device;

sending product information to the first user device for display, the product information corresponding to the identified first product associated with the touch;

receiving a first party cookie from the first user device;

determining products associated with the first user device based on the first party cookie; and populating a screen space in the tap wall based on at least one of the determined products.

8. The non-transitory, computer-readable medium of claim 7, the stages further comprising:

determining that no active users are associated with the touch;

sending a message from the server to cause the tap wall to display the address as part of prompting the first user;

in response to the first user device connecting to the server at the address, receiving a first party cookie from the first user device, the first party cookie including a product identifier for a second product that was viewed online; and storing the first and second products in a collection associated with the first user device.

9. The non-transitory, computer-readable medium of claim 7, the stages further including:

providing the at least one of the determined products as an input to a recommendation engine; and sending a link to an image of a recommended product to the tap wall to cause the recommended product to display in the screen space.

10. The non-transitory, computer-readable medium of claim 7, the stages further comprising:

associating a first ultrasonic frequency with the first user device;

sending a message from the server to the first user device causing the first user device to emit sound at the first ultrasonic frequency; and receiving the first ultrasonic frequency at a microphone in the tap wall, wherein the server sends the product information to the first user device based on distinguishing the first ultrasonic frequency from a second ultrasonic frequency associated with a second user device.

11. The non-transitory, computer-readable medium of claim 7, the stages further comprising:

receiving, at the server, a pairing request from a store device;

determining that the first user device is active at the tap wall; and creating a chat room for entry between the store device and the first user device.

12. The non-transitory, computer-readable medium of claim 7, the stages further comprising:

receiving, at the server from a store device, a second product to add to a collection associated with the first user device;

updating a cookie store associated with a first party cookie on the first user device, the cookie store being updated to include the second product and a sales agent identifier based on which sales agent is logged into the store device;

receiving a sale of the second product on a website that uses the first party cookie;

determining that the sales agent recommended the second product based on the sales agent identifier in the cookie store being associated with the second product; and crediting a sales commission to the sales agent.

13. The non-transitory, computer-readable medium of claim 7, wherein the message from the tap wall device includes a target store identifier and a target product identifier, and wherein the stages further include:

building a graph database with nodes that represent products and edges that represent relationships between the products;

identifying a first node with the target product identifier and retrieving the edges associated with the first node, the edges being associated with connected products;

based on a genetic algorithm, determining a top-ranked connected product; and sending a uniform resource locator to a second device in a tap wall that includes the tap wall device, causing the second device to display an image of the top-ranked connected product.

14. A method for linking in-store and out-of-store interactions of an anonymous first user, the stages comprising:

a tap wall including plurality of screens, wherein the plurality of screens are populated to include images of products available from a store;

detecting a touch on the tap wall, the tap wall including at least a first tap wall device where the touch is detected;

sending a message with an identifier from the tap wall to a server that the server uses to identify a first product associated with the touch;

prompting the first user to connect their first user device to an address;

opening a connection between the server and a first user device based on the first user device navigating to the address, wherein the address is provided to an anonymous user of the first user device;

sending product information to the first user device for display, the product information corresponding to the identified first product associated with the touch;

receiving a first party cookie from the first user device;

recommending a product based on information associated with the first party cookie; and sending the recommended product to the tap wall.

15. The method of claim 14, the stages further comprising:

determining that no active users are associated with the touch;

sending a message from the server to cause the tap wall to display the address as part of prompting the first user;

in response to the first user device connecting to the server at the address, receiving a first party cookie from the first user device, the first party cookie including a product identifier for a second product that was viewed online; and storing the first and second products in a collection associated with the first user device.

16. The method of claim 14, the stages further comprising:

associating a first ultrasonic frequency with the first user device;

sending a message from the server to the first user device causing the first user device to emit sound at the first ultrasonic frequency; and receiving the first ultrasonic frequency at a microphone in the tap wall, wherein the server sends the product information to the first user device based on distinguishing the first ultrasonic frequency from a second ultrasonic frequency associated with a second user device.

17. The method of claim 14, the stages further comprising:

receiving, at the server, a pairing request from a store device;

determining that the first user device is active at the tap wall;

receiving, at the server from a store device, a second product to add to a collection associated with the first user device;

updating a cookie store associated with a first party cookie on the first user device, the cookie store being updated to include the second product and a sales agent identifier based on which sales agent is logged into the store device;

receiving a sale of the second product on a website that uses the first party cookie;

determining that the sales agent recommended the second product based on the sales agent identifier in the cookie store being associated with the second product; and crediting a sales commission to the sales agent.

* * * * *